United States Patent

Fauser et al.

(10) Patent No.: US 11,034,396 B2
(45) Date of Patent: Jun. 15, 2021

(54) AIR DEFLECTING DEVICE FOR USE ON THE BOTTOM OF A MOTOR VEHICLE

(71) Applicant: Bayerische Motoren Werke Aktiengesellschaft, Munich (DE)

(72) Inventors: Markus Fauser, Munich (DE); Tino Ranft, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/420,452

(22) Filed: May 23, 2019

(65) Prior Publication Data

US 2019/0276098 A1 Sep. 12, 2019

Related U.S. Application Data

(63) Continuation of application No. PCT/EP2017/080395, filed on Nov. 24, 2017.

(30) Foreign Application Priority Data

Nov. 24, 2016 (DE) .................... 10 2016 223 351.3

(51) Int. Cl.
*B62D 35/02* (2006.01)
(52) U.S. Cl.
CPC ............. *B62D 35/02* (2013.01); *Y02T 10/82* (2013.01); *Y02T 10/88* (2013.01)
(58) Field of Classification Search
CPC ..................................................... B62D 35/02
USPC ..................................................... 296/180.1
See application file for complete search history.

(56) References Cited

U.S. PATENT DOCUMENTS

| 8,297,685 B2 * | 10/2012 | Wolf ..................... | B62D 35/02 296/180.3 |
|---|---|---|---|
| 2013/0049399 A1 | 2/2013 | Hoelzel et al. | |
| 2015/0274224 A1 | 10/2015 | Ito et al. | |
| 2015/0353149 A1 | 12/2015 | Wolf | |
| 2016/0039469 A1 * | 2/2016 | Jachowski ............. | B62D 25/16 296/180.1 |

FOREIGN PATENT DOCUMENTS

| CN | 102975779 A | 3/2013 |
| CN | 104619575 A | 5/2015 |
| CN | 204415546 U | 6/2015 |
| DE | 10 2011 119 168 A1 | 5/2013 |
| EP | 1 674 381 B1 | 9/2007 |
| JP | 10-278854 A | 10/1998 |
| JP | 2006-69396 A | 3/2006 |

(Continued)

OTHER PUBLICATIONS

International Search Report (PCT/ISA/210) issued in PCT Application No. PCT/EP2017/080395 dated Mar. 20, 2018 with English translation (four (4) pages).

(Continued)

*Primary Examiner* — Joseph D. Pape
(74) *Attorney, Agent, or Firm* — Crowell & Moring LLP

(57) ABSTRACT

An air deflecting device for use on an underside of a motor vehicle in front of a vehicle wheel includes at least one air deflection member. The air deflection member includes at least two air deflection member parts which allow the width of the air deflection member in the transverse vehicle direction to be modified.

13 Claims, 1 Drawing Sheet

(56) References Cited

FOREIGN PATENT DOCUMENTS

JP   2008-201156 A   9/2008
WO   WO 2007/074381 A2   7/2007

OTHER PUBLICATIONS

German-language Written Opinion (PCT/ISA/237) issued in PCT Application No. PCT/EP2017/080395 dated Mar. 20, 2018 with English translation (five (5) pages).
German-language Search Report issued in counterpart German Application No. 102016223351.3 dated Sep. 21, 2017 with partial English translation (12 pages).
English-translation of Chinese-language Office Action issued in Chinese Application No. 201780070758.4 dated Dec. 3, 2020 (six (6) pages).

* cited by examiner

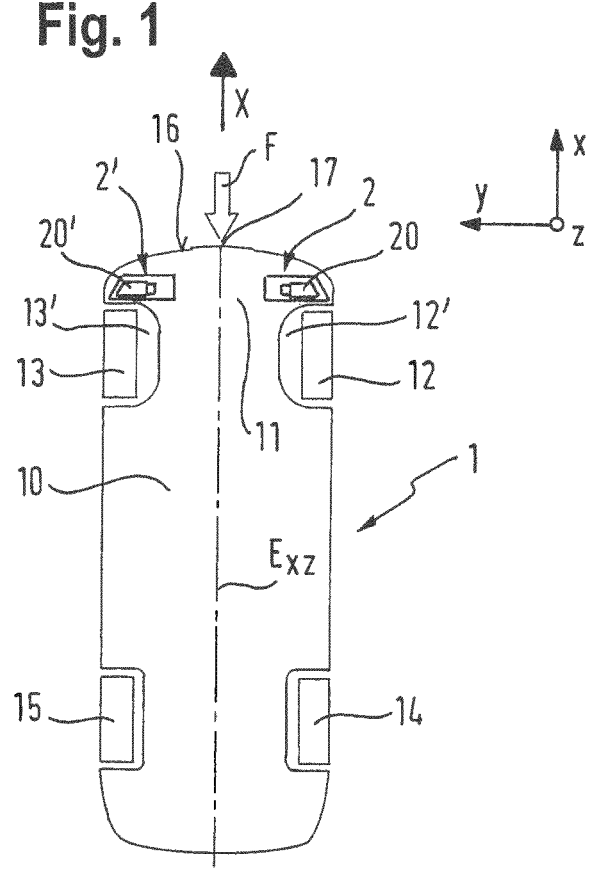
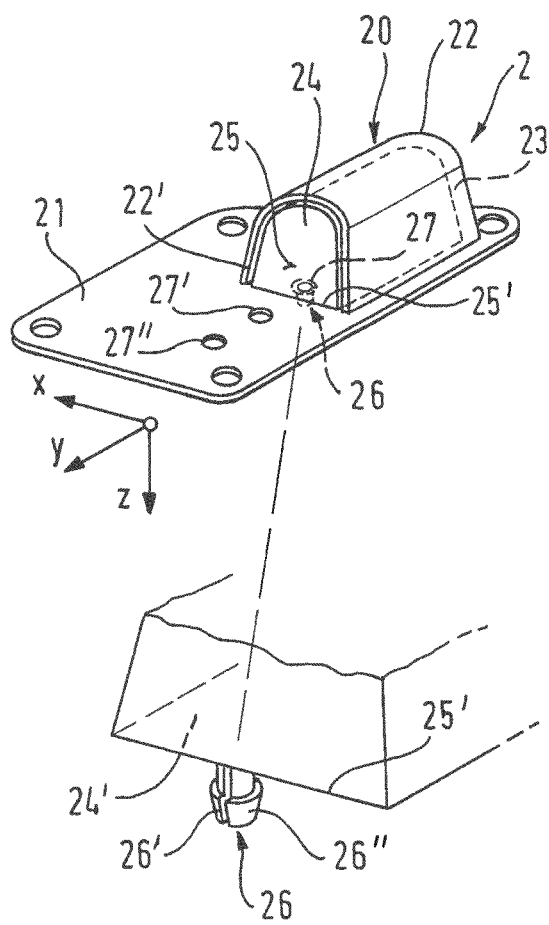
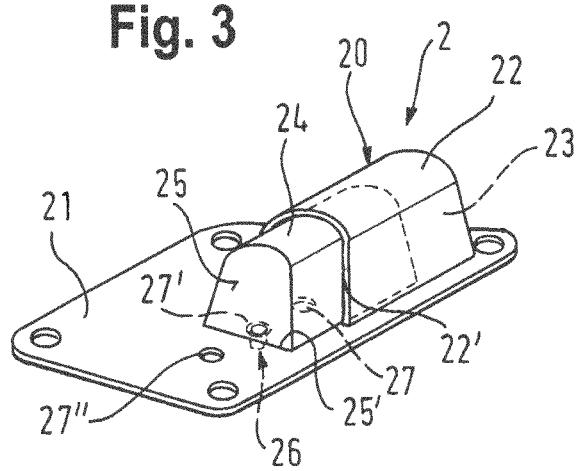
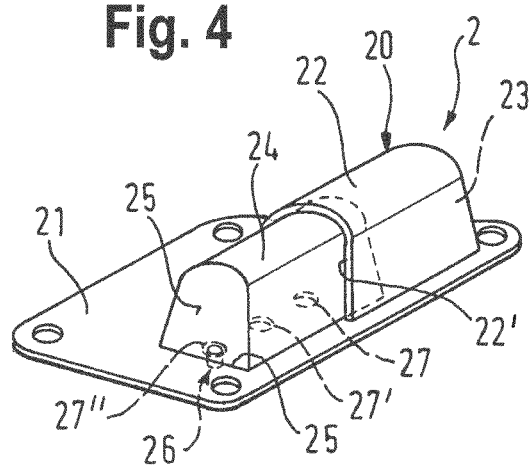

AIR DEFLECTING DEVICE FOR USE ON THE BOTTOM OF A MOTOR VEHICLE

CROSS REFERENCE TO RELATED APPLICATIONS

This application is a continuation of PCT International Application No. PCT/EP2017/080395, filed Nov. 24, 2017, which claims priority under 35 U.S.C. § 119 from German Patent Application No. 10 2016 223 351.3, filed Nov. 24, 2016, the entire disclosures of which are herein expressly incorporated by reference.

BACKGROUND AND SUMMARY OF THE INVENTION

The invention relates to an air deflecting device for use on the underside of a motor vehicle in front of a vehicle wheel. The invention also relates to a motor vehicle having such an air deflecting device.

EP 1 674 381 B1 has disclosed an air deflecting device for a vehicle which is arranged in the region in front of a vehicle wheel and which projects downward in the direction of a roadway. Such air deflecting devices serve for deflecting the air flow that acts on the vehicle during travel, that is to say the relative wind, past the vehicle wheel in order to, as far as possible, prevent the relative wind colliding with the vehicle wheel. These conventional air deflecting devices are adapted in terms of their dimensions to the vehicle wheel respectively installed on the vehicle; for example, if relatively wide wheels are installed on the vehicle, an undesired collision of the relative wind with the vehicle wheel and with the surroundings thereof can occur. Therefore, air deflecting devices of different widths are commonly stocked, and, during the vehicle manufacturing process, those air deflecting devices which are adapted to the wheels provided on the vehicle are installed. This leads to relatively complex and cumbersome stockkeeping and to a more cumbersome provision of parts at the vehicle assembly line.

It is an object of the present invention to provide a generic air deflecting device with which it is possible to simplify stockkeeping and the provision of parts in the manufacturing process. It is a further object to provide a correspondingly designed vehicle which enables these aims to be achieved.

These and other objects are achieved by an air deflecting device for use on the underside of a motor vehicle in front of a vehicle wheel, having at least one air deflecting body, wherein the air deflecting body has at least two air deflecting body elements by which the width extent of the air deflecting body in a vehicle transverse direction can be varied.

Said air deflecting device is distinguished by the fact that the air deflecting body has at least two air deflecting body elements, by means of which the extent of the air deflecting body in a vehicle transverse direction can be varied.

By way of this solution according to the invention, an adjustable air deflecting device is created, with which the width of the air deflecting body (as viewed in a vehicle transverse direction) can be easily adapted to the wheels with which the vehicle is equipped. Therefore, only one type of air deflecting device needs to be stocked and made available to the assembly technicians at the manufacturing line. Furthermore, through the provision of the air deflecting device according to the invention, a situation is prevented in which an air stream provided for brake cooling purposes is diverted or otherwise adversely affected. A situation is also prevented in which air flowing in uncontrolled fashion under the vehicle adversely affects the lift distribution and, in particular, increases the axle lift.

The invention consists in designing an air deflecting device so as to be variable in terms of its width extent, such that it can be adapted easily and inexpensively to a vehicle wheel, in particular to the width and/or to the design of a wheel, in particular of a front wheel of a vehicle. It is an aim to optimize at least one aerodynamic characteristic value, for example the air resistance and/or the axle lift. In particular, with the adaptation of the air deflecting device, it is sought to reduce the air resistance coefficient $c_x$ and/or the lift at the front axle of a vehicle.

According to the invention, by way of the variability of the width extent of the air deflecting body, the air flow that arises during forward travel of the vehicle is guided past the wheel, in particular a front wheel of the vehicle, and/or is guided along a wheel, in particular a front wheel of the vehicle, such that the least possible flow losses arise, and thus the air resistance is reduced. Since it is generally not possible for the wheel to be kept entirely free from an impending flow, it is the aim to guide the greatest possible fraction of the air flow past the wheel and/or to direct the air flow as far as possible parallel to the longitudinal axis of the vehicle.

By virtue of the air flow being guided past the wheel, that fraction of the air flow which impinges on the rotating wheel and in so doing gives rise to an increase in the air resistance owing to turbulence is reduced. The impingement of the air flow on the rotating wheel includes the impingement on the tread of the wheel and/or on one and/or both side surface(s) of the wheel (owing to an oblique impingement of flow on the wheel) and/or a passage of air obliquely or transversely through the wheel.

According to the invention, by way of the variability of the width extent of the air deflecting body, it is basically possible for one or more of these factors that increase the air resistance to be advantageously influenced.

Preferably, according to the invention, by way of the variability of the width extent of the air deflecting body, the width of the air deflecting body is adapted to the width of the wheel, in particular of the front wheel of the vehicle.

In addition, or alternatively, according to the invention, by way of the variability of the width extent of the air deflecting body, the air flow is directed such that the lateral impingement of flow on the wheel is influenced in an aerodynamically advantageous manner.

In addition, or alternatively, according to the invention, by way of the variability of the width extent of the air deflecting body, the air flow is directed such that the flow through the wheel is influenced in an aerodynamically advantageous manner.

Flow passes differently through the wheel in a manner dependent on the design of the wheel, in particular of the so-called wheel disk of the wheel. In other words, the volume flow and/or the direction of the air flow through the wheel disk is dependent on the design of the wheel, in particular of the wheel disk. The wheel disk is that region of the wheel which connects the hub region of the wheel to the rim region of the wheel, that is to say the region for holding the tire. The wheel disk may for example have substantially the form of a ring-shaped surface with apertures. This form is provided in particular in the case of steel wheels. Alternatively, the wheel disk may be formed in the manner of spokes with free spaces between the spokes. This form is provided in particular in the case of light metal wheels. The throughflow is influenced by means of the design of the wheel disk (form and/or number and/or area of the apertures). The direction and extent of the throughflow can be adapted by means of a variation of the width of the air deflecting body so as to realize an optimization from an aerodynamic aspect.

Aside from the advantages during the production of vehicles, the invention is also advantageous if different wheels are retroactively fitted to a vehicle. The retroactively installed wheels may differ in terms of width and/or throughflow characteristic from the wheels installed by the manufacturer. By varying the width extent of the air deflecting bodies, it is possible to realize an adaptation to the width and/or the throughflow characteristic of the retroactively installed wheels. For this purpose, the vehicle manufacturer or a manufacturer of wheels may determine the optimum width of the air deflecting body by means of measurements, simulations or calculations, and make these data available to the vehicle owner.

For example, in the event of a change from summer wheels to winter wheels, the width of the wheel often changes. Also, the winter wheels may have a different throughflow characteristic than the summer wheels. For example, winter wheels are often narrower and/or have a smaller air passage area in the wheel disk than summer wheels, in particular if winter wheels are designed as steel wheels.

It is advantageous if the air deflecting body elements are displaceable relative to one another. In this way, the width of the air deflecting body can be manually adapted quickly and in accordance with demand by virtue of the air deflecting body elements being displaced relative to one another.

It is also advantageous here if the relative displaceability of the air deflecting body elements is configured in detent steps, such that different widths of the air deflecting body in the vehicle transverse direction can be set, wherein detent and/or fixing devices are provided in order to position and/or fix the air deflecting body elements relative to one another. This makes it possible for the individual air deflecting devices to be reliably and lastingly adjusted to their desired longitudinal extent.

Alternatively, the air deflecting body elements may be fixed relative to one another by a clamping device. The clamping device may be designed such that continuously variable adjustability of the width of the air deflecting body is made possible.

The air deflecting body elements are preferably attachable, adjacent to one another, to a substructure. This alternative solution provides that the air deflecting body elements can be assembled in modular fashion to form an air deflecting body with the desired dimensions.

In one advantageous embodiment, the air deflecting device has a mounting base to which the air deflecting body elements are attached or attachable or with which at least one of the air deflecting body elements is integrally formed.

That part of the object which is directed to the motor vehicle is achieved by means of a motor vehicle having at least one front wheel, wherein, in front of the front wheel in a direction of travel, at least one air deflecting device according to the invention is arranged on the underbody of the motor vehicle such that the respective air deflecting body projects from the underbody toward the roadway. A motor vehicle equipped in this way is less expensive to manufacture because only one type of air deflecting device needs to be stocked for each vehicle side.

Here, the air deflecting body is particularly advantageously arranged exclusively in the region immediately in front of a wheel, in particular a front wheel, of the vehicle. Such air deflecting bodies are also referred to as "wheel spoilers".

Owing to the direct interaction between the air deflecting body according to the invention and the wheel, the air deflecting body is preferably arranged a short distance in front of the wheel (as viewed in the direction of travel of the vehicle). Preferably, a rear surface of the air deflecting body is spaced apart from the foremost region of the tread of the wheel by 25 centimeters or less. In a particularly preferred embodiment, a rear surface of the air deflecting body is spaced apart from the foremost region of the tread of the wheel by 15 centimeters or less.

The center of the air deflecting body may—in relation to the transverse direction of the vehicle—be substantially aligned with the center of the wheel. The center of the air deflecting body is preferably offset inwardly in the direction of the vehicle center in relation to the center of the wheel.

The air deflecting body may have approximately the width of the wheel. The air deflecting body is preferably wider than the wheel.

It is advantageous here if the vehicle is a two-track vehicle with two front wheels provided so as to be laterally spaced apart from one another on the vehicle, and if at least one air deflecting device according to the invention is provided in front of each of the two front wheels.

The two air deflecting devices according to the invention are arranged exclusively in the region directly in front of the respective wheel (as viewed in the direction of travel of the vehicle). Thus, no air deflecting device according to the invention is provided in the region between the wheels.

In a preferred embodiment of a motor vehicle according to the invention, the air deflecting devices provided in front of a respective front wheel are of mirror-symmetrical design with respect to one another, whereby an optimized aerodynamic design of the motor vehicle is realized.

The two air deflecting bodies are preferably arranged symmetrically in relation to a central longitudinal plane (X-Z plane) of the vehicle.

The air deflecting device according to the invention is to be distinguished from an air deflecting device which extends over a significant part of the vehicle width. Such air deflecting devices are normally arranged on a paneling of a front bumper and are referred to in general linguistic usage as "front spoilers". These cover primarily the central region of the vehicle and thus influence primarily the air flow in the central region of the underbody of the vehicle. As viewed in a direction of travel of the vehicle, they are arranged at a greater distance from the wheels of the vehicle than the air deflecting bodies according to the invention. The known front spoilers are, in terms of their aerodynamic action, not adapted to the width and/or the design of the wheels situated behind them.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a bottom view of a motor vehicle equipped with air deflecting devices according to an embodiment of the invention.

FIG. 2 is a perspective illustration of an exemplary air deflecting device according to the invention in a first state, with a minimal extent in a vehicle transverse direction.

FIG. 3 shows the exemplary air deflecting device from FIG. 2 in a second state with an increased extent in a vehicle transverse direction.

FIG. 4 shows the exemplary air deflecting device from FIG. 2 in a third state with a maximum extent in a vehicle transverse direction.

DETAILED DESCRIPTION OF THE DRAWINGS

FIG. 1 shows a view from below of a vehicle 1 in the form of a motor vehicle, having a vehicle underbody 10, a left-hand front wheel 12 as viewed in a direction of travel X, a right-hand front wheel 13, a left-hand rear wheel 14 and a right-hand rear wheel 15.

In front of the left-hand front wheel 12, a left-hand-side air deflecting device 2, which will be described in more detail below and which has an air deflecting body 20, is arranged on the front part 11 of the vehicle underbody 10 in front of the wheel arch 12' of the left-hand front wheel 12. A right-hand-side air deflecting device 2', which is of mirror-symmetrical design and which has an air deflecting body 20', is arranged analogously in front of the wheel arch 13' of the right-hand front wheel 13 on the front part 11 of the vehicle underbody 10.

During forward travel, the vehicle front end 16 is impinged on by the relative wind F. Proceeding from the aerodynamic stagnation point 17, situated at the foremost point of the vehicle front end (for example in the region of the license plate), of the vehicle 1, the impinging air is partially conducted over the vehicle 1 and partially forced under the vehicle 1, where this so-called underflow flows between the vehicle underbody 10 and a roadway (not shown). The air impinging on the vehicle 1 is however displaced not only in relation to the vehicle vertical axis z but also in relation to the vehicle transverse axis y. Accordingly, a portion of the impinging air is conducted from the stagnation point 17 obliquely to the left and another portion of the impinging air is conducted obliquely to the right. This applies both to the air flow which is directed upward and to the air flow which is diverted downward.

Consequently, the underflow of the vehicle 1 has lateral flow regions in which the air flows obliquely from the vehicle longitudinal central plane $E_{xz}$ to the left-hand side and to the right-hand side. The front wheels 12, 13, which constitute aerodynamic obstructions to the underflow, are therefore impinged on in each case obliquely from the inside, which is aerodynamically unfavorable and increases the overall flow resistance of the vehicle 1.

In order to achieve as straight as possible an impingement of flow on the respective front wheels 12, 13 directly from the front, the left-hand and right-hand air deflecting devices 2, 2', respectively, are provided on the vehicle underbody 10 in front of the respective front wheels 12, 13. These air deflecting devices divert the air flow that impinges obliquely thereon and directs said air flow from the front in the direction of the associated front wheel 12, 13, such that said diverted air flow is directed inward and outward past the front wheel 12, 13 and as far as possible does not impinge on the front surface (tire tread) of the front wheel 12, 13. The satisfaction of this criterion is dependent directly on the width of the front wheel 12, 13, such that the respective air deflecting device 2, 2' must be adapted to the width of the associated front wheel 12, 13.

Rather than providing different air deflecting devices in a manner dependent on the width of the front wheels 12, 13 installed on the vehicle 1, a variably adjustable air deflecting device 2, 2' is created and used. This variably adjustable air deflecting device 2, 2' will be described below with reference to FIGS. 2 to 4. Owing to the mirror-symmetrical design of the air deflecting devices 2, 2', only the left-hand-side air deflecting device 2 will be described in more detail; the following statements therefore also apply analogously to the right-hand-side air deflecting device 2'.

The air deflecting device 2 has an aerodynamic dam body 20 which projects from the vehicle underbody 10 downward toward the roadway and which has already been referred to in the introduction as the air deflecting body and which diverts the impinging air in the manner described above. The dam body 20 itself has a first air deflecting body element 22, which is either attached to or formed in one piece with a mounting base 21 designed for connection to the vehicle underbody 10, or which is attachable directly to the vehicle underbody 10.

The first air deflecting body element 22 is formed, at least in certain regions, with a cavity 23 and is open at one side, preferably at the side 22' pointing toward the vehicle longitudinal central plane $E_{xz}$. The remaining sides of the first air deflecting body element 22 are closed, wherein, however, the rear side pointing toward the front wheel 12 may also be open. Into the cavity 23 there is inserted a second air deflecting body element 24, which is movable out of the cavity 23 through the open side 22' of the first air deflecting body element 22.

In FIG. 2, the second air deflecting body element 24 is almost entirely received in the cavity 23, and the inner face side 25, pointing toward the vehicle longitudinal central plane $E_{xz}$, of the second air deflecting body element 24 substantially closes the open side 22' of the first air deflecting body element 22. To the top side 24', pointing toward the mounting base 21, of the second air deflecting body element 24, at least one locking pin 26 is attached to or formed integrally with the face side 25 or with the top side 24', preferably in the region of that edge 25' of the inner face side 25 which in the installed state points toward the vehicle underbody 10. This locking pin 26 has, at its free end, at least two hook-shaped spring lugs 26', 26" which are designed such that they can be inserted into holes 27, 27', 27" provided in the manner of a raster on the vehicle underbody 10 or on the mounting base 21 and can engage therein. In the example shown in FIG. 2, the locking pin 26 has been engaged in the hole 27 and thus fixes the second air deflecting body element 24 in its position in which it has been almost entirely inserted into the cavity 23. In this configuration, the width extent of the dam body 20 in the vehicle transverse direction y is restricted to the width of the first air deflecting body element 22, and is thus at a minimum.

FIG. 3 shows a configuration of the dam body 20 in which the second air deflecting body element 24 projects to a certain extent out of the cavity 23 and is fixed by the locking pin 26 engaged in the second hole 27'. The width of the dam body 20 is in this case increased in relation to the configuration shown in FIG. 2 and is adapted to a wider front wheel 12.

FIG. 4 finally shows a configuration of the dam body 20 in which the second air deflecting body element 24 projects yet further out of the cavity 23 and is fixed by way of the locking pin 26 engaged in the third hole 27". The width of the dam body 20 is in this case increased in relation to the configuration shown in FIG. 3, and assumes a maximum position. This configuration is adapted to an even wider front wheel 12.

The air deflecting device 2 according to the invention which is adjustable so as to be variable in width not only reduces the stockkeeping costs for a vehicle manufacturer and the required provision space at the manufacturing line during the vehicle manufacturing process, but also makes it possible, in the event of the vehicle 1 being retrofitted at a later point in time with different, for example wider, wheels, for the width of the dam body 20 to be adapted to the new wheel width. Thus, even in the event of later retrofitting of the vehicle 1, an adaptation of the vehicle aerodynamics can be performed in a simple manner without exchanging vehicle parts.

Even though the dam body 20 is shown in a simplified illustration as a barrier in the exemplary embodiment shown, the invention self-evidently encompasses all suitable aerodynamically designed dam bodies which are designed to be adjustable in width in the described manner.

The invention is not restricted to the above exemplary embodiment, which serves merely for the general explanation of the core concept of the invention. Within the scope of protection, the device according to the invention may rather also assume embodiments other than those described above.

Reference designations in the claims, in the description and in the drawings serve merely for improved understanding of the invention and are not intended to restrict the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air deflecting device for use on an underside of a motor vehicle in front of a vehicle wheel, comprising:
   at least one air deflecting body comprising at least two air deflecting body elements, wherein
   a width extent of the at least one air deflecting body in a vehicle transverse direction is variable by transversely displacing at least one of the two air deflecting body elements,
   the at least two air deflecting body elements are configured to protrude downward when mounted on the underside of the vehicle in front of the vehicle wheel, and
   the air deflecting body is configured such that the variable width extent adapts to different wheel widths and/or wheel designs of the vehicle wheel with which the motor vehicle is equipped in order that air flow arising during forward travel is guided past and/or along the equipped vehicle wheel.

2. The air deflecting device according to claim 1, wherein the air deflecting body elements are transversely displaceable relative to one another.

3. The air deflecting device according to claim 2, wherein the relative displaceability of the air deflecting body elements is configured in detent steps, such that different widths of the air deflecting body in the vehicle transverse direction are settable, wherein detent and/or fixing devices are provided in order to position and/or fix the air deflecting body elements relative to one another.

4. The air deflecting device according to claim 1, wherein the air deflecting body elements are attachable, adjacent to one another, to a sub structure.

5. The air deflecting device according to claim 1, further comprising:
   a mounting base to which the air deflecting body elements are attached or attachable, or with which at least one of the two air deflecting body elements is integrally formed.

6. A motor vehicle, comprising:
   an underbody;
   at least one front wheel; and
   at least one air deflecting device arranged in front of the front wheel in a direction of travel on the underbody of the motor vehicle,
   wherein the air deflecting device comprises:
   at least one air deflecting body comprising at least two air deflecting body elements, wherein
   a width extent of the at least one air deflecting body in a vehicle transverse direction is variable by transversely displacing at least one of the two air deflecting body elements,
   the at least two air deflecting body elements are configured to protrude downward when mounted on the underside of the vehicle in front of the front wheel, and
   the air deflecting body is configured such that the variable width extent adapts to different front wheel widths and/or front wheel designs of the front wheel with which the motor vehicle is equipped in order that air flow arising during forward travel is guided past and/or along the equipped front wheel.

7. The motor vehicle according to claim 6, wherein the vehicle is a two-track vehicle with two front wheels provided so as to be laterally spaced apart from one another on the vehicle, and
two air deflecting devices are provided, one being respectively provided in front of each of the two front wheels.

8. The motor vehicle according to claim 7, wherein the two air deflecting devices provided in front of respective front wheels are of mirror-symmetrical design with respect to one another.

9. The motor vehicle according to claim 6, wherein a rear surface of the air deflecting device is spaced apart from a foremost region of a tread of the front wheel by 25 cm or less.

10. The motor vehicle according to claim 6, wherein a center of the air deflecting device, in relation to a transverse direction of the vehicle, is substantially aligned with a center of the front wheel.

11. The motor vehicle according to claim 6, wherein a center of the air deflecting device, in relation to a transverse direction of the vehicle, is offset inwardly in the direction of a vehicle center in relation to a center of the front wheel.

12. The motor vehicle according to claim 7, wherein the two air deflecting devices are laterally spaced apart from one another such that no air deflecting device is provided in a region between the two front wheels.

13. The motor vehicle according to claim 6, wherein the air deflecting device has a same width of the front wheel.

* * * * *